(No Model.)
L. M. WAINWRIGHT.
BICYCLE FRAME.
No. 519,783. Patented May 15, 1894.
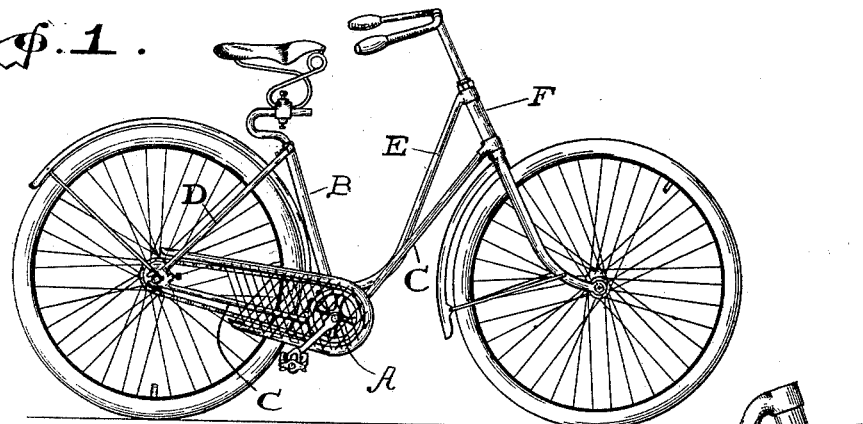
Fig. 1.
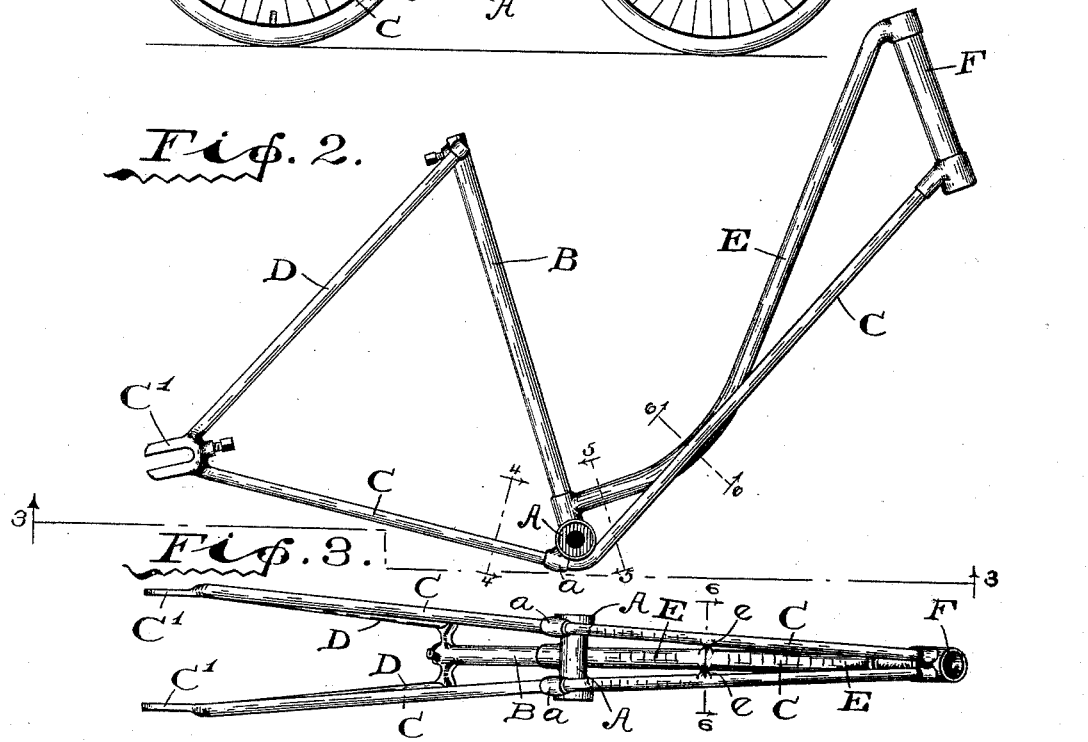
Fig. 2.
Fig. 3.
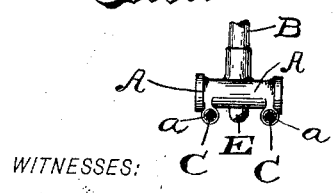
Fig. 4.
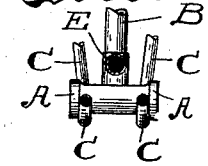
Fig. 5.
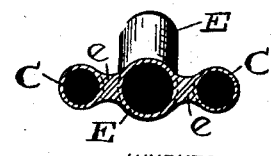
Fig. 6.
WITNESSES:
F. W. Warner.
J. A. Walsh.
INVENTOR
Lucius M. Wainwright,
BY
Chester Bradford,
ATTORNEY.
THE NATIONAL LITHOGRAPHING COMPANY,
WASHINGTON, D. C.

UNITED STATES PATENT OFFICE.

LUCIUS M. WAINWRIGHT, OF INDIANAPOLIS, INDIANA, ASSIGNOR TO CENTRAL CYCLE MANUFACTURING COMPANY, OF SAME PLACE.

BICYCLE-FRAME.

SPECIFICATION forming part of Letters Patent No. 519,783, dated May 15, 1894.

Application filed May 4, 1893. Serial No. 472,941. (No model.)

*To all whom it may concern:*

Be it known that I, LUCIUS M. WAINWRIGHT, a citizen of the United States, residing at Indianapolis, in the county of Marion and State of Indiana, have invented certain new and useful Improvements in Bicycle-Frames, of which the following is a specification.

The object of my said invention is to produce a comparatively light but very strong frame for ladies' bicycles, and it consists mainly in the combination with two straight bars extending up from the pedal-bearing to the head or front portion of the frame, of a single curved bar extending between said two bars, and thence up, as shown, and arranged and attached as will presently be more fully described.

Referring to the accompanying drawings, which are made a part hereof, and on which similar letters of reference indicate similar parts, Figure 1 is a side elevation of a bicycle, the frame of which embodies my present invention; Fig. 2 a side elevation, on a larger scale, of said frame separately; Fig. 3 an under side plan, as seen from the dotted line 3 3 under Fig. 2, and Figs. 4, 5 and 6 transverse sectional views on the dotted lines 4 4, 5 5 and 6 6, respectively.

In said drawings the portions marked A represent the pedal-bearing; B the saddle-supporting standard; C the side-bars; D brace-bars extending from said side-bars to said standard; E a curved bar extending from said standard or said pedal-bearing forward, first to between the bars C, and thence upward to the top of the forward portion or head of the frame, and F said frame-head. This frame in its general outline is quite similar to the corresponding frames used in other ladies' bicycles, but it possesses some peculiarities of construction and arrangement which render it much stronger and stiffer than those of the common construction, and this not only without any increase of the usual weight, but rather a decrease.

The axle-bearing A has two eyes *a* formed integrally therewith, and extending out on the under side thereof, which are bored out and fitted to receive the side-bars C. Said side-bars C are bent where they pass the axle-bearing, and pass through the eyes *a* formed on said bearing, and thence to the frame-head F in one direction, and back to a fork C' for the hind wheel-bearing in the other. The standard B and brace-bars D are attached and formed as usual. The curved bar E, however, is attached differently from any former construction. It extends from the pedal bearing, or from the standard just above said bearing, forward to between the two side-bars, and a sufficient distance from the standard B to permit the rider to mount and dismount conveniently. It is curved at this point, and thence extends upwardly on an angle to the top of the frame-head F, where it is attached by a suitable coupling. At the point where it is curved and passes between the two side-bars C it is secured thereto by small struts or wings *e*, which are secured to its outer sides and to the inner sides of said side-bars, in a manner which makes the three bars at this point substantially integral with each other, and said bars may be arranged as shown so as not to occupy any greater space vertically than the diameter of the larger of said bars. The parts are usually united at this, as well as other points, by brazing, as is common in bicycle frames. This construction and arrangement produces a very stiff, solid and substantial frame, which will not yield or twist, while at the same time, by the thorough uniting and bracing of the parts relatively to each other, the material of which said frame is composed may be made lighter than is usual.

Having thus fully described my said invention, what I claim as new, and desire to secure by Letters Patent, is—

1. The combination, in a bicycle frame, with the pedal-bearing, side-bars, standard, and frame-head, of a curved brace-bar extending from said standard or said pedal-bearing forward near to said side-bars and secured thereto at that point, and thence upwardly to the upper end of the frame-head, where it is also secured, substantially as shown and described.

2. The combination, in a bicycle frame, of the two side-bars, and a curved brace-bar extending from the pedal-bearing or lower end of the standard forward to the brace-bars and thence to the upper portion of the frame-head, and struts or wings interposed between said brace-bar and said side-bars at the point where they approach each other, and whereby they are firmly united together at said point, substantially as shown and described.

3. The combination, in a bicycle frame, of the side-bars, and a curved forward brace-bar, said brace-bar passing between and into the same plane with said side-bars and there firmly united thereto, substantially as and for the purpose set forth.

4. The combination, in a bicycle frame, of an axle bearing having integral eyes for the side bars, said side bars passing through said eyes and thus secured to said axle-bearing, a socket also formed integrally with said axle bearing on the upper side, the saddle-supporting standard entering the upper end of and thus secured to said socket, a central brace-bar secured to the front side of said socket and extending thence to the frame-head, and said frame-head.

In witness whereof I have hereunto set my hand and seal, at Indianapolis, Indiana, this 1st day of May, A. D. 1893.

LUCIUS M. WAINWRIGHT. [L. S.]

Witnesses:
CHESTER BRADFORD,
JAMES A. WALSH.